United States Patent
Hirose et al.

(10) Patent No.: US 10,096,815 B2
(45) Date of Patent: Oct. 9, 2018

(54) ELECTRIC POWER STORAGE DEVICE

(71) Applicant: KABUSHIKI KAISHA TOYOTA JIDOSHOKKI, Kariya-shi, Aichi-ken (JP)

(72) Inventors: Takayuki Hirose, Kariya (JP); Shinji Suzuki, Kariya (JP); Motoaki Okuda, Kariya (JP)

(73) Assignee: KABUSHIKI KAISHA TOYOTA JIDOSHOKKI, Kariya-shi, Aichi-ken (JP)

( * ) Notice: Subject to any disclaimer, the term of this patent is extended or adjusted under 35 U.S.C. 154(b) by 0 days.

(21) Appl. No.: 15/533,417

(22) PCT Filed: Nov. 30, 2015

(86) PCT No.: PCT/JP2015/083637
§ 371 (c)(1),
(2) Date: Jun. 6, 2017

(87) PCT Pub. No.: WO2016/093100
PCT Pub. Date: Jun. 16, 2016

(65) Prior Publication Data
US 2017/0373302 A1 Dec. 28, 2017

(30) Foreign Application Priority Data
Dec. 11, 2014 (JP) .................. 2014-251104

(51) Int. Cl.
*H01M 2/34* (2006.01)
*H01M 2/02* (2006.01)
(Continued)

(52) U.S. Cl.
CPC ......... *H01M 2/345* (2013.01); *H01M 2/0237* (2013.01); *H01M 2/30* (2013.01); *H01M 10/05* (2013.01); *H01M 2220/20* (2013.01)

(58) Field of Classification Search
CPC ............ H01M 10/05; H01M 2220/20; H01M 2/0237; H01M 2/30; H01M 2/345
See application file for complete search history.

(56) References Cited

U.S. PATENT DOCUMENTS

2011/0008654 A1   1/2011   Kim et al.
2011/0039136 A1   2/2011   Byun et al.
(Continued)

FOREIGN PATENT DOCUMENTS

DE   112012005761 T5   11/2014
EP      2284932 A1      2/2011
(Continued)

OTHER PUBLICATIONS

International Preliminary Report on Patentability dated Jun. 13, 2017 from the International Searching Authority in application No. PCT/JP2015/083637.

*Primary Examiner* — Carlos Barcena
(74) *Attorney, Agent, or Firm* — Sughrue Mion, PLLC

(57) ABSTRACT

A rechargeable battery is provided with a pressure release valve and a current interruption mechanism. The current interruption mechanism includes a deformation plate. When the internal pressure of the case reaches an interruption activation pressure, the deformation plate receives the internal pressure and is deformed to break a conducting portion. In the current interruption mechanism, a pressure that is set for maintaining the sealing at the contact portion between the deformation plate and a negative electrode conductor is defined as a sealing portion withstanding pressure, and the pressure that is set for maintaining the shape of the case is defined as a case withstanding pressure. The pressure for activating the pressure release valve is defined as a valve activation pressure. In this case, the sealing portion withstanding pressure and the valve activation pressure are set (Continued)

higher than the interruption activation pressure and lower than the case withstanding pressure.

5 Claims, 7 Drawing Sheets

(51) Int. Cl.
*H01M 2/30* (2006.01)
*H01M 10/05* (2010.01)

(56) References Cited

U.S. PATENT DOCUMENTS

| | | | |
|---|---|---|---|
| 2011/0268999 A1* | 11/2011 | Nagai | H01M 2/1241 |
| | | | 429/53 |
| 2012/0237802 A1 | 9/2012 | Byun et al. | |
| 2015/0072179 A1 | 3/2015 | Itabashi | |
| 2015/0079432 A1* | 3/2015 | Okuda | H01M 2/345 |
| | | | 429/61 |

FOREIGN PATENT DOCUMENTS

| | | | |
|---|---|---|---|
| EP | 2337110 A1 | 6/2011 | |
| JP | 11-329405 A | 11/1999 | |
| JP | 2001-43845 A | 2/2001 | |
| JP | 2012-195278 A | 10/2012 | |
| JP | 2013-157149 A | 8/2013 | |
| WO | WO-2013154166 A1 * | 10/2013 | H01M 2/345 |

* cited by examiner

ELECTRIC POWER STORAGE DEVICE

CROSS REFERENCE TO RELATED APPLICATIONS

This application is a National Stage of International Application No. PCT/JP2015/083637, filed on Nov. 30, 2015, which claims priority from Japanese Patent Application No. 2014-251104, filed on Dec. 11, 2014, the contents of all of which are incorporated herein by reference in their entirety.

TECHNICAL FIELD

The present invention relates to a power storage device including a pressure release valve and either a current interruption device or a current reduction mechanism.

BACKGROUND ART

Vehicles such as electric vehicles (EV) and plug-in hybrid vehicles (PHV) include a rechargeable battery such as a lithium-ion battery. The rechargeable battery is used as a power storage device that stores electric power supplied to a drive source, which is an electric motor. The rechargeable battery includes an electrode assembly accommodated in a case. The electrode assembly is configured by, for example, stacking or winding strip-shaped positive electrodes and negative electrodes with separators located in between. Active material layers are formed on both sides of each of the positive electrodes and the negative electrodes.

Such a rechargeable battery includes a mechanism that interrupts or reduces current in a current-carrying path between the electrode assembly and an electrode terminal and a pressure release valve (for example, refer to Patent Document 1). The rechargeable battery of Patent Document 1 includes a mechanism that interrupts current (hereinafter, referred to as a current interruption mechanism). If the internal pressure of the case reaches a specified activation pressure due to generation of gas at the time of overcharging and overdischarging, the current interruption mechanism interrupts the current-carrying path and stops the overcharging and overdischarging state to prevent increase in the internal pressure caused by generation of gas. If the internal pressure of the case is increased and reaches the specified activation pressure, the pressure release valve is ruptured and releases the gas to the outside of the case to prevent increase in the internal pressure.

In the rechargeable battery that includes the above-mentioned mechanism that interrupts or reduces current and the pressure release valve, the activation pressure of the pressure release valve is set to a value higher than the activation pressure of the mechanism that interrupts or reduces current. Thus, if the increase in the internal pressure cannot be limited by interrupting or reducing the current, the pressure release valve is activated to limit the increase in the internal pressure of the case.

PRIOR ART DOCUMENT

Patent Document

Patent Document 1: Japanese Laid-Open Patent Publication No. 11-329405

SUMMARY OF THE INVENTION

Problems that the Invention is to Solve

However, even if generation of gas is limited by interrupting or reducing current, and the pressure is released by the pressure release valve in the rechargeable battery that includes the mechanism that interrupts or reduces current and the pressure release valve, the case may be damaged by increase in the internal pressure if, for example, the generation speed of gas is faster than the pressure release speed or the internal pressure is rapidly increased.

Accordingly, it is an objective of the present invention to provide a power storage device that prevents damage on a case by increase in the internal pressure.

Means for Solving the Problems

To achieve the foregoing objective, a power storage device is provided that includes an electrode assembly, a case, which accommodates the electrode assembly, an electrode terminal, which supplies and receives power to and from the electrode assembly, a conductor, which connects the electrode assembly to the electrode terminal, a current interruption mechanism, which interrupts a current-carrying path between the electrode terminal and the electrode assembly when an internal pressure of the case reaches an interruption activation pressure, and a pressure release valve, which is located on a wall portion of the case and releases the pressure in the case to the outside of the case when the internal pressure of the case exceeds a valve activation pressure. The current interruption mechanism includes a conducting portion, which allows current to flow between the electrode terminal and the conductor, and a deformation plate, which contacts the conductor and defines, in the case, a first space, a pressure in which is equal to the internal pressure of the case, and a second space, a pressure in which is maintained at a pressure outside the case, wherein a contact portion between the deformation plate and the conductor is sealed. The current interruption mechanism is configured such that, when the internal pressure of the case reaches the interruption activation pressure, the deformation plate receives the internal pressure and is deformed to break the conducting portion. A pressure that is set for maintaining the sealing at the contact portion is defined as a sealing portion withstanding pressure. A pressure that is set for maintaining the shape of the case is defined as a case withstanding pressure. The sealing portion withstanding pressure and the valve activation pressure are set higher than the interruption activation pressure and lower than the case withstanding pressure.

With this configuration, when gas is generated from the electrode assembly due to overcharging and overdischarging, and the internal pressure of the case is increased, first, the internal pressure reaches the interruption activation pressure. Thus, the deformation plate is deformed in the current interruption mechanism to interrupt the current-carrying path. This stops the overcharging and overdischarging state of the electrode assembly and limits increase in the internal pressure caused by generation of gas. However, for example, if the generation speed of gas is rapid, the internal pressure may be increased. In this case, when the internal pressure exceeds the sealing portion withstanding pressure and the valve activation pressure, the contact portion between the deformation plate and the conductor in the current interruption mechanism loses the sealing function. Thus, the first space in the case is connected to the second space, which has a pressure equal to the pressure outside the case, and the pressure in the case is released from the first space to the outside of the case via the second space. The pressure release valve is also activated to release the pressure in the case to the outside of the case. Thus, even if the internal pressure is increased after activation of the current interruption mechanism, the opening area for releasing the pressure is increased compared with a case in which the pressure is released from only one of the current interruption mechanism and the pressure release valve. This limits increase in the internal pressure.

To achieve the foregoing objective, another power storage device is provided that includes an electrode assembly, a case, which accommodates the electrode assembly, an electrode terminal, which supplies and receives power to and from the electrode assembly, a conductor, which connects the electrode assembly to the electrode terminal, a current interruption mechanism, which interrupts a current-carrying path between the electrode terminal and the electrode assembly when an internal pressure of the case reaches an interruption activation pressure, and a pressure release valve, which is located on a wall portion of the case and releases the pressure in the case to the outside of the case when the internal pressure of the case exceeds a valve activation pressure. The current interruption mechanism includes a conducting portion, which allows current to flow between the electrode terminal and the conductor, and a deformation plate, which contacts the conductor and defines, in the case, a first space, a pressure in which is equal to the internal pressure of the case, and a second space, a pressure in which is maintained at a pressure outside the case, wherein a contact portion between the deformation plate and the conductor is sealed. The current interruption mechanism is configured such that, when the internal pressure of the case reaches the interruption activation pressure, the deformation plate receives the internal pressure and is deformed to break the conducting portion. A pressure that is set for maintaining the sealing at the contact portion is defined as a sealing portion withstanding pressure. In a case in which the electrode assembly expands and contracts in accordance with normal charging and discharging, a pressure that is set for maintaining the shape of the case within a range in which the case expands and contracts in accordance with the expansion and contraction of the electrode assembly is defined as a case withstanding pressure. The sealing portion withstanding pressure and the valve activation pressure are set higher than the interruption activation pressure and lower than the case withstanding pressure.

With this configuration, while permitting expansion and contraction of the case that may be caused during normal charging and discharging, the current interruption mechanism is activated only when the internal pressure is increased to a degree that may cause excessive expansion and contraction of the case.

In the power storage device, the sealing portion withstanding pressure is preferably higher than the valve activation pressure.

With this configuration, after the pressure release valve is activated, the pressure is released from the current interruption mechanism. Thus, the pressure release through the pressure release valve is assisted by the pressure release through the current interruption mechanism.

In the power storage device, the current interruption mechanism preferably includes a contact plate, which allows current to flow between the electrode terminal and the conductor via the conducting portion and is located in the second space. The deformation plate preferably contacts a surface of the conductor facing the electrode assembly in a state in which the deformation plate is located at a position closer to the electrode assembly than the contact plate and between the conducting portion and the electrode assembly and in which the deformation plate covers the conducting portion.

With this configuration, when the internal pressure of the case reaches the interruption activation pressure, the deformation plate, which has received the interruption activation pressure, is deformed to bulge away from the electrode assembly to the conductor. As a result, the deformation plate, which has received the interruption activation pressure, collides with the conducting portion and breaks the conduct, and the contact plate is deformed toward the wall portion of the case. Thus, the contact plate and the conductor are separated from each other, and the electrical connection between the conductor and the electrode terminal via the contact plate is physically interrupted. Although the current interruption mechanism includes the deformation plate and the contact plate, the contact portion of the deformation plate is located closer to the electrode assembly than the contact plate. Thus, when the contact portion loses the sealing function, the first space and the second space are connected, and the pressure in the case is released to the outside of the case.

To achieve the foregoing objectives, another power storage device is provided that includes an electrode assembly, a case, which accommodates the electrode assembly, positive-electrode and negative electrode terminals, which supply and receive power to and from the electrode assembly, a current reduction mechanism, which reduces current from the electrode terminals to the electrode assembly when the internal pressure of the case reaches an activation pressure, and a pressure release valve, which is located on a wall portion of the case and releases the pressure in the case to the outside of the case when the internal pressure of the case exceeds a valve activation pressure. The current reduction mechanism includes a short-circuit member electrically connected to one of the electrode terminals, and a deformation plate, which is arranged to be in contact with the case and defines a first space, a pressure in which is equal to the internal pressure of the case, and a second space, a pressure in which is maintained at a pressure outside the case, wherein a contact portion between the deformation plate and the case is sealed. The current reduction mechanism is configured such that when the internal pressure of the case reaches the activation pressure, the deformation plate is deformed by receiving the internal pressure and allows current to flow through the short-circuit member via the deformation plate. A pressure that is set for maintaining the sealing at the contact portion is defined as a sealing portion withstanding pressure. A pressure that is set for maintaining the shape of the case is defined as a case withstanding pressure. The sealing portion withstanding pressure and the valve activation pressure are set higher than the activation pressure and lower than the case withstanding pressure.

With this configuration, when gas is generated from the electrode assembly due to overcharging and overdischarging, and the internal pressure of the case is increased, the internal pressure first reaches the activation pressure. Thus, in the current reduction mechanism, the deformation plate is deformed to electrically connect the short-circuit members, and the electrode terminals are short-circuited via the short-circuit members. Of the current-carrying paths between the electrode terminals, the current-carrying path via the short-circuit member has a smaller electrical resistance than the current-carrying path via the electrode assembly. Thus, the current flows between the electrode terminals via the short-circuit members, and current that flows to the electrode assembly is reduced. This restricts overcharging and overdischarging. The configuration limits increase in the internal pressure caused by generation of gas. However, for example, if the generation speed of gas is rapid, the internal pressure may be increased. In this case, if the internal pressure exceeds the sealing portion withstanding pressure and the valve activation pressure, the contact portion between the deformation plate and the case in the current reduction mechanism loses the sealing function, and the first space in the case is connected to the second space, which has a pressure equal to the pressure outside the case. Thus, the pressure in the case is released from the first space to the outside of the case via the second space. The pressure release valve is also activated to release the pressure in the case to the outside of the case. Thus, even if the internal pressure is increased after activation of the current reduction mechanism, the opening area for releasing the pressure is increased compared with a case in which the pressure is released from only one of the current interruption mechanism and the pressure release valve. This limits the increase in the internal pressure.

In the power storage device, the sealing portion withstanding pressure is preferably higher than the valve activation pressure.

With this configuration, after the pressure release valve is activated, the pressure is released from the current reduction mechanism. Thus, the pressure release through the pressure release valve is assisted by the pressure release through the current reduction mechanism.

In the power storage device, the power storage device is preferably a rechargeable battery.

Effects of the Invention

The present invention prevents damage on the case by increase in the internal pressure.

MODES FOR CARRYING OUT THE INVENTION

First Embodiment

Hereinafter, a power storage device according to a first embodiment will be described with reference to FIGS. 1 to 7. The power storage device is applied to a rechargeable battery. The power storage device of the present embodiment is configured as a 9V lithium-ion rechargeable battery.

Figure 1:
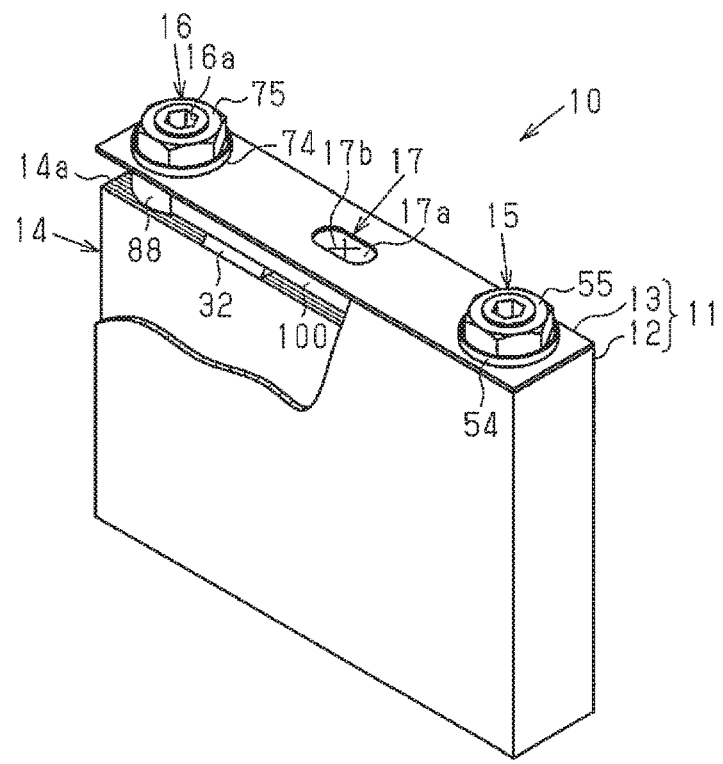
FIG. 1 is a perspective view of a rechargeable battery according to a first embodiment.

As shown in FIG. 1, the power storage device, which is a rechargeable battery 10 in this embodiment, includes a rectangular parallelepiped case 11. The case 11 includes a box-shaped case main body 12, which has one open end and one closed end, and a rectangular flat lid 13, which closes the opening portion of the case main body 12. The case main body 12 and the lid 13 are joined by welding.

The rechargeable battery 10 includes an electrode assembly 14 and electrolyte solution (not shown), which are accommodated in the case 11, and a positive terminal 15 and a negative terminal 16, which supply and receive power to and from the electrode assembly 14. The positive terminal 15 and the negative terminal 16 are secured to the wall of the case 11, which is the lid 13 in this embodiment.

Figure 2:
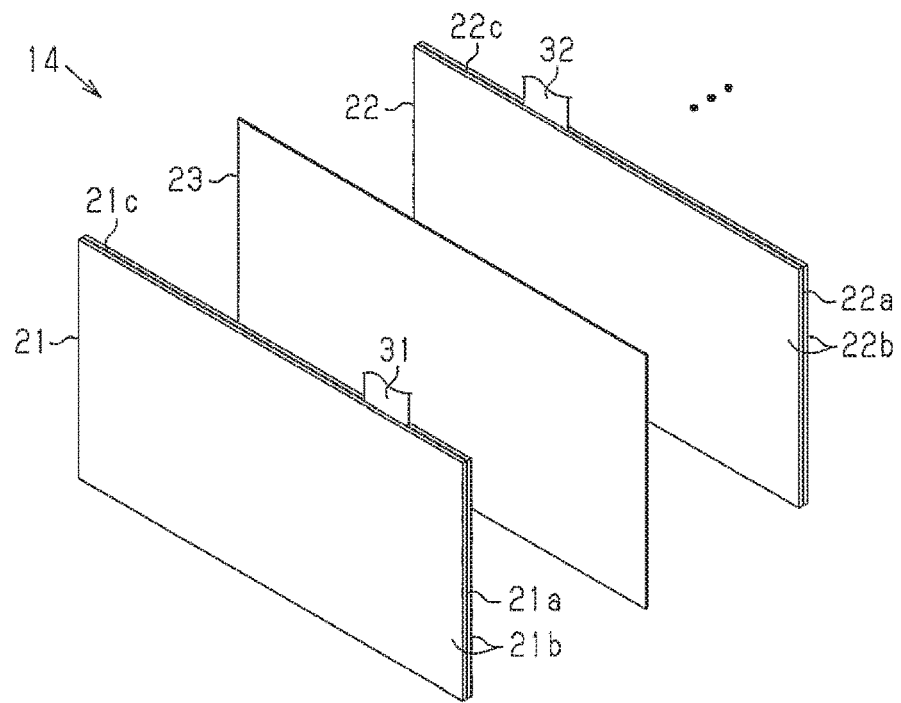
FIG. 2 is an exploded perspective view of an electrode assembly illustrating components of the electrode assembly.

As shown in FIG. 2, the electrode assembly 14 is configured by alternately stacking positive electrodes 21 and negative electrodes 22 with separators 23 located in between. The separators 23 are porous films through which ions that are involved in conducting power can path through. The positive electrodes 21, the negative electrodes 22, and the separators 23 are rectangular sheets.

Each positive electrode 21 includes, for example, a sheet of rectangular positive-electrode foil 21a made of aluminum and positive-electrode active material layers 21b. The positive-electrode active material layers 21b are provided on both sides of the sheet of positive-electrode foil 21a. Each negative electrode 22 includes, for example, a rectangular sheet of negative-electrode foil 22a made of copper and negative-electrode active material layers 22b. The negative-electrode active material layers 22b are provided on both sides of the sheet of negative-electrode foil 22a. Each positive electrode 21 includes a positive-electrode tab 31. The positive-electrode tab 31 projects from an edge 21c of the positive electrode 21. The negative electrode 22 includes a negative-electrode tab 32. The negative-electrode tab 32 projects from an edge 22c of the negative electrode 22. The positive electrodes 21, the separators 23, and the negative electrodes 22 are stacked such that the tabs 31, 32 having the same polarity are arranged in a row.

Figure 3:
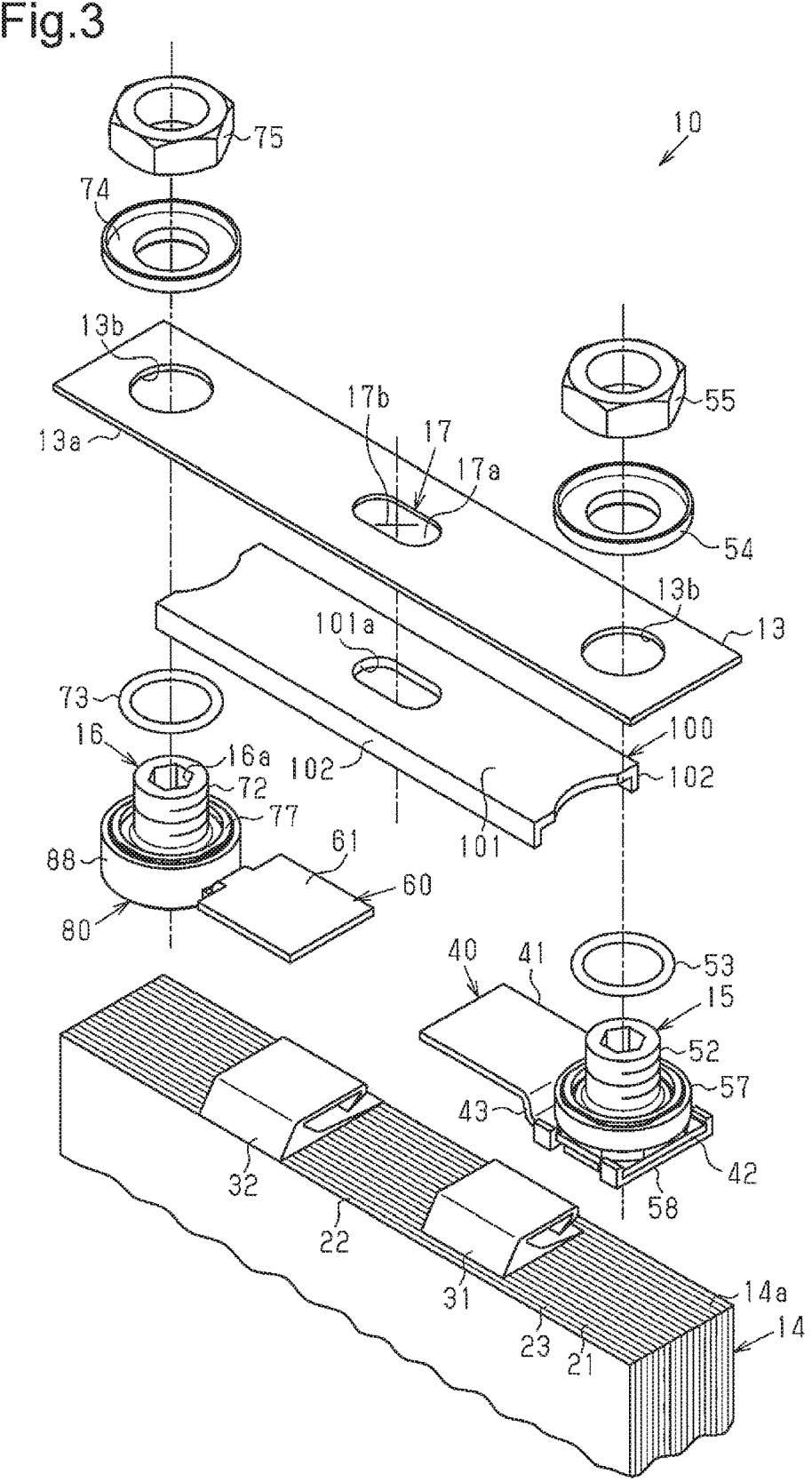
FIG. 3 is an exploded perspective view of the rechargeable battery.

As shown in FIG. 3, the negative-electrode tabs 32 are collected at a position close to one side in the stacking direction of the positive electrodes 21 and the negative electrodes 22 and are folded toward the other side in the collected state. Similarly, the positive-electrode tabs 31 are collected at a position close to one side in the stacking direction of the positive electrodes 21 and the negative electrodes 22 and are folded toward the other side in the collected state. In the present embodiment, the positive-electrode tabs 31 and the negative-electrode tabs 32 are folded in the same direction. The electrode assembly 14 has an end surface 14a on which the positive-electrode tabs 31 and the negative-electrode tabs 32 are located. The electrode assembly 14 is accommodated in the case 11 with the end surface 14a facing an inner surface 13a of the lid 13, on which the positive terminal 15 and the negative terminal 16 are secured.

The rechargeable battery 10 includes a positive-electrode conductor 40. The positive-electrode conductor 40 is used to electrically connect the positive-electrode tabs 31 to the positive terminal 15. The positive-electrode conductor 40 is located between the inner surface 13a of the lid 13 and the end surface 14a of the electrode assembly 14 and is joined to both the positive-electrode tabs 31 and the positive terminal 15.

The positive-electrode conductor 40 is formed of a sheet of metal plate such as an aluminum plate. The positive-electrode conductor 40 includes a positive-electrode tab joint portion 41 and a terminal joint portion 42. The positive-electrode tab joint portion 41 is joined to the positive-electrode tabs 31. The terminal joint portion 42 is joined to the positive terminal 15. The positive-electrode conductor 40 includes a positive-electrode curved portion 43. The positive-electrode curved portion 43 is continuous with both the positive-electrode tab joint portion 41 and the terminal joint portion 42 and curves (bends) like a crank.

Figure 4:
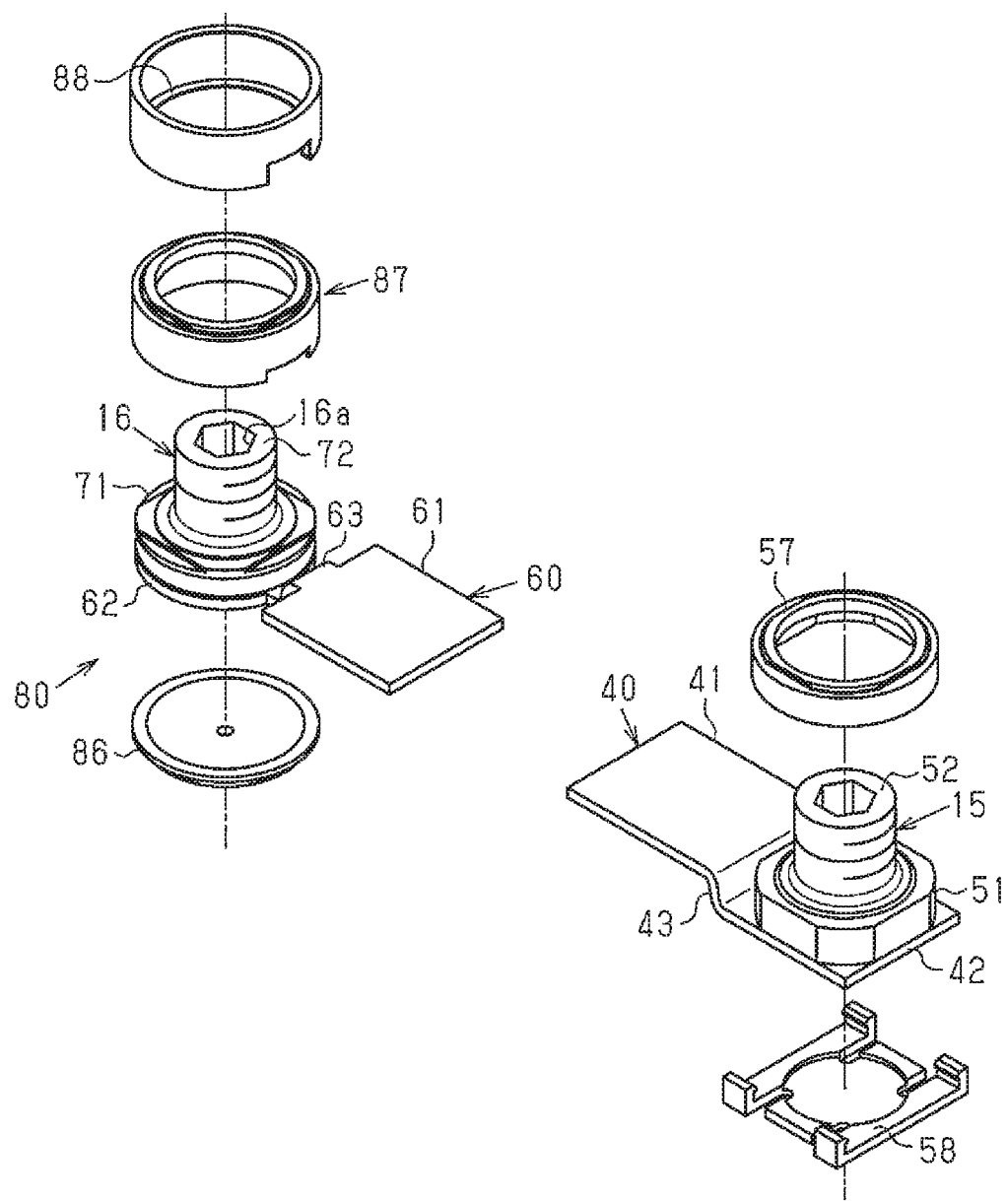
FIG. 4 is an exploded perspective view illustrating configurations of the conductors and the electrode terminals.

As shown in FIG. 4, the positive terminal 15 includes a rectangular column-shaped positive-electrode head 51 and a tubular positive-electrode shaft 52. The tubular positive-electrode shaft 52 projects from the positive-electrode head 51 toward the lid 13 and includes a threaded outer circumferential surface. The positive-electrode shaft 52 projects outside the case 11 via a through-hole 13b in the lid 13.

As shown in FIG. 3, the positive-electrode head 51 is located in the case 11 and projects from the inner surface 13a of the lid 13 toward the electrode assembly 14. The positive-electrode head 51 has an outer diameter greater than the inner diameter of the associated through-hole 13b. The positive terminal 15 includes a shaft hole that extends through the positive-electrode head 51 and the positive-electrode shaft 52 in the axial direction. Although not shown, the shaft hole is an internally threaded bore for fastening a bus bar to the positive terminal 15. In the axial direction of the positive-electrode shaft 52, a sealing ring 53 is located between opposed surfaces of the positive-electrode head 51 and the lid 13. The positive-electrode shaft 52 is inserted in the sealing ring 53.

The positive-electrode shaft 52 receives a flanged ring 54. A tubular portion of the flanged ring 54 is fitted in the associated through-hole 13b. A nut 55 is screwed to the positive-electrode shaft 52 from above the flanged ring 54 so that the positive terminal 15 is secured to the lid 13.

The rechargeable battery 10 includes a positive terminal insulation member 57 and a joint portion insulation member 58. The positive terminal insulation member 57 covers the positive-electrode head 51 from above. The joint portion insulation member 58 is located between the terminal joint portion 42 and the end surface 14a of the electrode assembly 14. The positive terminal insulation member 57 is located between the positive-electrode head 51 and the lid 13. The positive terminal insulation member 57 has insulation property. The joint portion insulation member 58 has insulation property and restricts contact between the terminal joint portion 42 and the end surface 14a of the electrode assembly 14.

The rechargeable battery 10 includes a negative-electrode conductor 60. The negative-electrode conductor 60 is used to electrically connect the negative-electrode tabs 32 to the negative terminal 16. The negative-electrode conductor 60 is located between the inner surface 13a of the lid 13 and the end surface 14a of the electrode assembly 14 and is joined to both the negative-electrode tabs 32 and the negative terminal 16.

The negative-electrode conductor 60 is made of a sheet of metal plate such as a copper plate. As shown in FIG. 3 or 4, the negative-electrode conductor 60 includes a negative-electrode tab joint portion 61 and an interruption joint portion 62. The negative-electrode tab joint portion 61 is joined to the negative-electrode tabs 32. The interruption joint portion 62 is joined to a current interruption mechanism 80. Furthermore, the negative-electrode conductor 60 includes a negative-electrode curved portion 63. The negative-electrode curved portion 63 is continuous with both the negative-electrode tab joint portion 61 and the interruption joint portion 62 and is curved (bent) like a crank.

The negative terminal 16 includes a negative-electrode head 71 and a tubular negative-electrode shaft 72. The tubular negative-electrode shaft 72 projects from the negative-electrode head 71 toward the lid 13 and includes a threaded outer circumferential surface. The negative-electrode shaft 72 projects outside the case 11 via the associated through-hole 13b of the lid 13.

Figure 5:
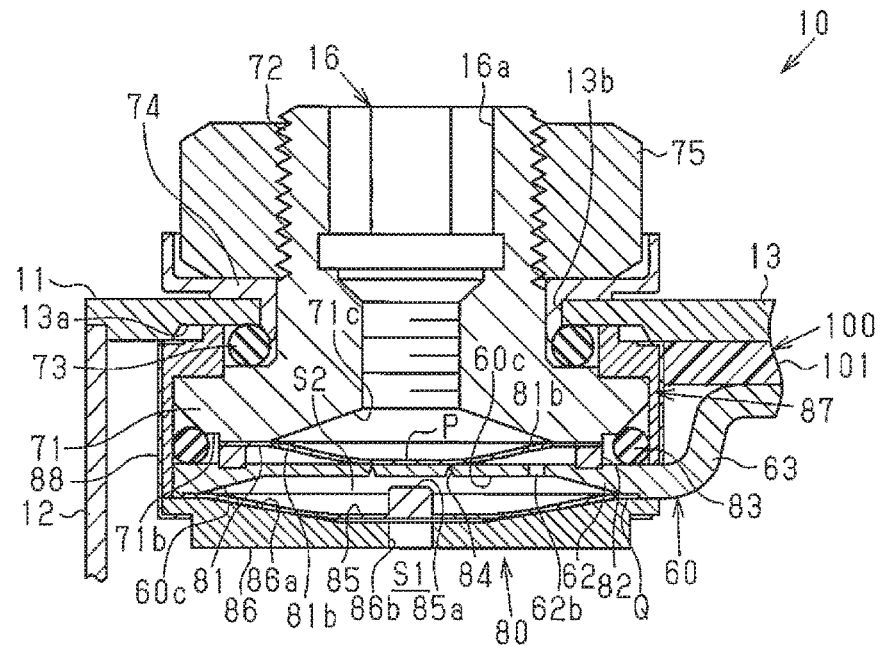
FIG. 5 is a cross-sectional view of a current interruption mechanism.

As shown in FIG. 5, the negative-electrode head 71 is located in the case 11. A surface 71b of the negative-electrode head 71 that faces the electrode assembly 14 includes a terminal recess 71c. The terminal recess 71c is a basin-shaped depression formed toward the lid 13. The negative terminal 16 includes a shaft hole 16a. The shaft hole 16a extends through the negative-electrode shaft 72 and the negative-electrode head 71 in the axial direction. Although not shown, the shaft hole 16a is an internally threaded bore for fastening a bus bar to the negative terminal 16. The terminal recess 71c communicates with the outside of the case 11 via the shaft hole 16a. The negative-electrode head 71 has an outer diameter greater than the inner diameter of the associated through-hole 13b. A sealing ring 73 is located between the opposed surfaces of the negative-electrode head 71 and the lid 13. The negative-electrode shaft 72 is inserted in the sealing ring 73.

A flanged ring 74 is inserted in the negative-electrode shaft 72. A tubular portion of the flanged ring 74 is fitted in the associated through-hole 13b. A nut 75 is screwed to the negative-electrode shaft 72 from above the flanged ring 74 so that the negative terminal 16 is secured to the lid 13.

The rechargeable battery 10 includes the current interruption mechanism 80. The current interruption mechanism 80 is located between the negative terminal 16 and the electrode assembly 14. The current interruption mechanism 80 electrically connects the negative terminal 16 to the negative-electrode conductor 60. If the internal pressure of the case 11 reaches a predetermined interruption activation pressure, the current interruption mechanism 80 interrupts a current-carrying path between the negative terminal 16 and the electrode assembly 14 and interrupts electrical connection between the negative terminal 16 and the electrode assembly 14. That is, when the internal pressure of the case 11 has not reached the interruption activation pressure, the current interruption mechanism 80 configures part of the current-carrying path between the negative terminal 16 and the electrode assembly 14. However, when the internal pressure of the case 11 reaches the interruption activation pressure, the current interruption mechanism 80 interrupts the above-described current-carrying path. The current-carrying path between the negative terminal 16 and the electrode assembly 14 is configured by a deformation plate 85 and a contact plate 81, which will be described below, and the negative-electrode conductor 60.

The current interruption mechanism 80 includes the contact plate 81. The contact plate 81 is joined to both the interruption joint portion 62 of the negative-electrode conductor 60 and the negative-electrode head 71. The contact plate 81 is a diaphragm configured by conductive material. The contact plate 81 has a disk shape. The contact plate 81 is located between the terminal recess 71c and the electrode assembly 14 and covers the terminal recess 71c. The outer circumferential portion of the contact plate 81 that protrudes outward from the terminal recess 71c and the peripheral portion of the terminal recess 71c of the negative-electrode head 71 are joined by spot welding. The contact plate 81 includes a communication hole 81b. The communication hole 81b extends through the contact plate 81 along the thickness. The communication hole 81b connects spaces in the rechargeable battery 10 on both sides of the contact plate 81, which serves as a boundary.

The portion of the contact plate 81 opposed to the terminal recess 71c bulges toward the electrode assembly 14 in a normal state. The bulging portion of the contact plate 81 is joined to the interruption joint portion 62 of the negative-electrode conductor 60. Thus, the current interruption mechanism 80 includes a conducting portion P between the negative terminal 16 and the negative-electrode conductor 60 via the contact plate 81. The conducting portion P allows current to flow between the negative-electrode conductor 60 and the negative terminal 16.

The current interruption mechanism 80 includes an insulation ring 82 on the outer circumference of the contact plate 81. The insulation ring 82 is located between the opposed surfaces of the interruption joint portion 62 and the negative-electrode head 71 and enables the contact plate 81 to bulge toward the interruption joint portion 62. The outer circumferential portion of the contact plate 81 is supported by being sandwiched between the insulation ring 82 and the negative-electrode head 71. A sealing member 83 is located outward of the insulation ring 82 between the negative-electrode head 71 and the interruption joint portion 62.

The surface of the interruption joint portion 62 of the negative-electrode conductor 60 that is opposed to the electrode assembly 14 includes an interruption recess 60c. The interruption recess 60c is a basin-shaped depression that is depressed away from the electrode assembly 14 toward the lid 13. The bottom surface of the interruption recess 60c contacts the contact plate 81. The portion of the interruption joint portion 62 that forms the bottom surface of the interruption recess 60c configures the conducting portion P. The bottom surface of the interruption recess 60c includes a breakable groove 84. The breakable groove 84 surrounds the conducting portion P. The breakable groove 84 is, for example, annular and thinner than parts of the interruption joint portion 62 other than the breakable groove 84. The negative-electrode conductor 60 includes a communication hole 62b in the interruption joint portion 62. The communication hole 62b connects both sides of the interruption joint portion 62, which serves as a boundary.

The current interruption mechanism 80 includes the deformation plate 85. The deformation plate 85 is deformed by the internal pressure of the case 11. The deformation plate 85 is a diaphragm made of elastic material such as a metal plate. The deformation plate 85 is located between the interruption recess 60c of the interruption joint portion 62 and the electrode assembly 14 and covers the interruption recess 60c. The deformation plate 85 has a disk shape. The entire circumference of the outer circumferential portion of the deformation plate 85 contacts the interruption joint portion 62. A contact portion Q between the outer circumferential portion of the deformation plate 85 and the interruption joint portion 62 is secured by welding. This seals the gap between the deformation plate 85 and the interruption joint portion 62.

The current interruption mechanism 80 includes a second space S2 defined between the interruption recess 60c of the interruption joint portion 62 and the deformation plate 85. The second space S2 communicates with the outside of the case 11 via the communication hole 62b of the interruption joint portion 62, the communication hole 81b of the contact plate 81, and the shaft hole 16a. Thus, the pressure of the second space S2 is maintained at an atmospheric pressure.

The second space S2 is sealed by the contact portion Q between the deformation plate 85 and the interruption joint portion 62 and is separated from a first space S1, which is the space in the case 11. A first surface of the deformation plate 85 faces the first space S1 in the case 11, and a second surface of the deformation plate 85 faces the second space S2. Thus, the internal pressure of the case 11 acts on the first surface of the deformation plate 85, and the atmospheric pressure acts on the second surface.

The deformation plate 85 bulges toward the electrode assembly 14 in a normal state. The deformation plate 85 includes a protrusion 85a. The protrusion 85a is located on the bulging portion of the deformation plate 85 at a position opposed to the conducting portion P and protrudes toward the interruption joint portion 62. The protrusion 85a is formed of insulating material and opposed to the conducting portion P, which is surrounded by the breakable groove 84. When the internal pressure of the case 11 reaches the predetermined interruption activation pressure, the deformation plate 85 is deformed to bulge toward the interruption joint portion 62.

The current interruption mechanism 80 includes a protective member 86. The protective member 86 is located between the deformation plate 85 and the electrode assembly 14 and covers the deformation plate 85. The protective member 86 is located between the opposed surfaces of the deformation plate 85 and the electrode assembly 14. The protective member 86 prevents the deformation plate 85 from being deformed before the above-mentioned interruption activation pressure is reached due to, for example, an impact applied to the deformation plate 85. The protective member 86 has a disk shape. The surface of the protective member 86 that is opposed to the deformation plate 85 includes a support recess 86a. The support recess 86a is depressed toward the electrode assembly 14. A gas hole 86b is formed in the bottom surface of the support recess 86a at a position opposed to the protrusion 85a. The gas hole 86b extends through the protective member 86.

The rechargeable battery 10 includes a crimp member 88. The crimp member 88 unifies an insulating negative-electrode insulation member 87, which covers the negative-electrode head 71, the negative-electrode head 71, the contact plate 81, the insulation ring 82, the sealing member 83, the negative-electrode conductor 60, the deformation plate 85, and the protective member 86.

As shown in FIG. 3, the rechargeable battery 10 includes an insulation cover 100. The insulation cover 100 is located between the lid 13 and both the positive-electrode conductor 40 and the negative-electrode conductor 60. The insulation cover 100 is configured by, for example, insulating plastic material. The insulation cover 100 is located to extend between the positive-electrode tab joint portion 41 and the negative-electrode tab joint portion 61. The insulation cover 100 includes a rectangular plate-shaped main body 101 and an upright portion 102. The upright portion 102 extends upright from an edge in the transverse direction of the main body 101 toward the electrode assembly 14. The main body 101 of the insulation cover 100 includes a communication hole 101a.

Figure 6:
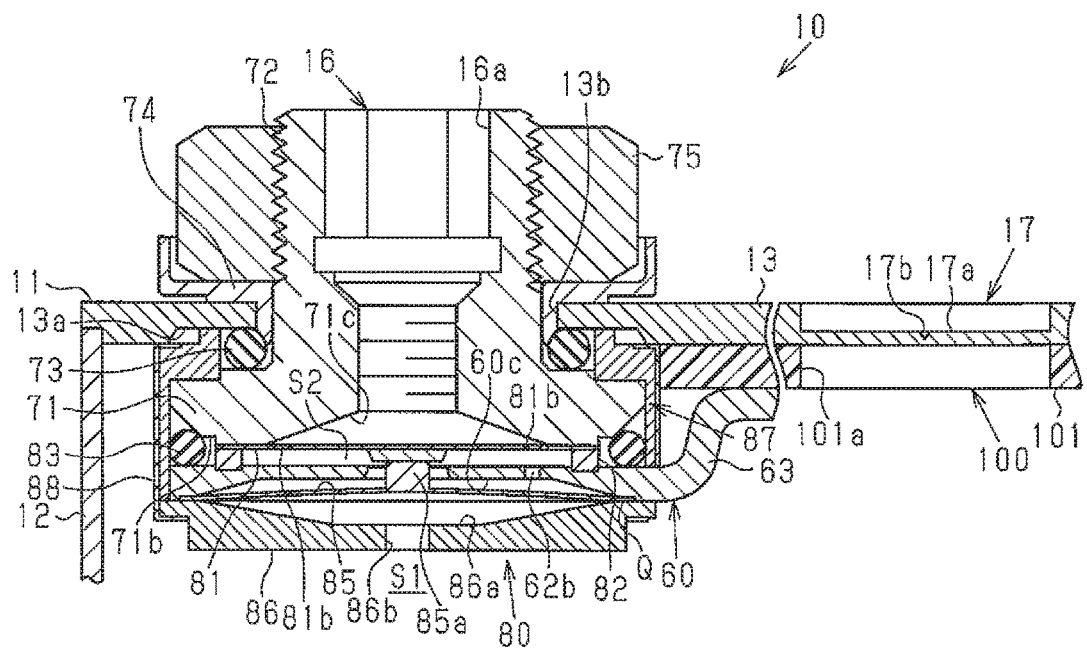
FIG. 6 is a cross-sectional view illustrating a state in which the current interruption mechanism is activated.

As shown in FIGS. 1 and 6, the rechargeable battery 10 includes a pressure release valve 17 in the wall portion, which is the lid 13 in this embodiment. The pressure release valve 17 is activated and ruptured when the internal pressure of the case 11 exceeds a predetermined valve activation pressure and connects the inside and the outside of the case 11 such that the internal pressure of the case 11 is not excessively increased. The valve activation pressure is set to a pressure that allows the pressure release valve 17 to activate before cracks or breakage occurs in the case 11 itself or the joint portion between the case main body 12 and the lid 13. The pressure release valve 17 includes a thin plate-shaped valve body 17a. The thickness of the valve body 17a is less than the plate thickness of the lid 13. The valve body 17a is formed integrally with the lid 13. The valve body 17a includes a groove 17b that allows the valve body 17a to be ruptured by concentration of the pressure applied from the inside of the case 11.

The rechargeable battery 10 configured as described above can have pressure that causes cracks or breakage in the case 11 itself or the joint portion between the case main body 12 and the lid 13. To maintain the shape of the case 11, a predetermined case withstanding pressure P1 is set in the rechargeable battery 10. The case withstanding pressure P1 refers to a pressure at which cracks or breakage is caused in the case 11 itself or the joint portion between the case main body 12 and the lid 13 and at which the case 11 becomes unable to maintain sealing. In a case in which the electrode assembly 14 of the rechargeable battery 10 expands and contracts in accordance with normal charging and discharging, the shape of the case 11 is assumed to be maintained even if the case 11 expands and contracts in accordance with the expansion and contraction of the electrode assembly 14. Thus, when the internal pressure of the case 11 is less than the case withstanding pressure P1, the case 11 is prevented from being damaged by the internal pressure. In the present embodiment, the case withstanding pressure P1 is greater than or equal to 1.5 MPa.

An interruption activation pressure P2 is set for the current interruption mechanism 80. The interruption activation pressure P2 is a pressure at which the current-carrying path is interrupted by the current interruption mechanism 80 by deforming the deformation plate 85. In the current interruption mechanism 80, a sealing portion withstanding pressure P4 is set for the contact portion Q. The sealing portion withstanding pressure P4 is a pressure set for maintaining sealing at the contact portion Q. Thus, when the internal pressure of the case 11 exceeds the sealing portion withstanding pressure P4, the contact portion Q is broken and becomes unable to maintain sealing.

The sealing portion withstanding pressure P4 can be adjusted by, for example, the penetration depth when the outer circumferential portion of the deformation plate 85 is welded to the interruption joint portion 62. The deeper the penetration depth, the greater becomes the welding strength between the deformation plate 85 and the interruption joint portion 62, and the contact portion Q becomes less likely to be broken when the internal pressure of the case 11 acts on the contact portion Q. Thus, the deeper the penetration depth at the contact portion Q, the greater becomes the sealing portion withstanding pressure P4. The shallower the penetration depth, the lower becomes the welding strength between the deformation plate 85 and the interruption joint portion 62, and the contact portion Q becomes more likely to be broken when the internal pressure of the case 11 acts on the contact portion Q. Thus, the shallower the penetration depth at the contact portion Q, the lower becomes the sealing portion withstanding pressure P4.

A valve activation pressure P3 is set for the pressure release valve 17. The valve activation pressure P3 is set to a pressure at which the pressure release valve 17 is activated before cracks or breakage occurs in the case 11 itself or the joint portion between the case main body 12 and the lid 13. Thus, when the internal pressure of the case 11 exceeds the valve activation pressure P3, the pressure release valve 17 is activated and prevents breakage of the case 11. The valve activation pressure P3 can be adjusted as required by controlling the thickness of the valve body 17a and the depth and the size of the groove 17b. In the present embodiment, the valve activation pressure P3 is set to a value greater than or equal to 0.5 MPa and less than 2.0 MPa.

The case withstanding pressure P1 is set to the highest among the case withstanding pressure P1, the interruption activation pressure P2, the valve activation pressure P3, and the sealing portion withstanding pressure P4. To allow the current interruption mechanism 80 to first interrupt the current when the internal pressure is increased, the interruption activation pressure P2 is set to the lowest value and is set to a value greater than or equal to 0.2 MPa and less than 1 MPa in the present embodiment. Furthermore, to allow the pressure release valve 17 to release the pressure after the current interruption mechanism 80 has been activated, the valve activation pressure P3 is set to be higher than the interruption activation pressure P2. In addition, to allow the pressure to be released from the current interruption mechanism 80 after activation of the pressure release valve 17, the sealing portion withstanding pressure P4 is set to be higher than the valve activation pressure P3. In the present embodiment, the sealing portion withstanding pressure P4 is set to a value greater than or equal to 1 MPa and less than 2 MPa. The pressures are set to satisfy the following relational expression 1.

Interruption activation pressure P2<Valve activation pressure P3<Sealing portion withstanding pressure P4<Case withstanding pressure P1   Relational Expression 1

Next, operation of the rechargeable battery 10 will be described.

As shown in FIG. 6, in the rechargeable battery 10, when gas is generated in the electrode assembly 14 at the time of overcharging and overdischarging, the internal pressure of the case 11 is increased. When the internal pressure reaches the interruption activation pressure P2, the deformation plate 85 that has received the interruption activation pressure P2 is deformed to bulge toward the interruption joint portion 62. Thus, the protrusion 85a collides with the conducting portion P, which is surrounded by the breakable groove 84. This breaks the conducting portion P of the negative-electrode conductor 60 and deforms the contact plate 81 toward the lid 13. Thus, the contact plate 81 and the negative-electrode conductor 60 are brought into a separated state. This physically interrupts electrical connection between the negative-electrode conductor 60 and the negative terminal 16.

When the current interruption mechanism 80 is activated, the overcharging and overdischarging state is stopped to limit increase in the internal pressure caused by generation of gas. However, although current is interrupted by the current interruption mechanism 80, if, for example, the increase in the internal pressure is rapid, the internal pressure is increased and exceeds the valve activation pressure P3.

Figure 7:
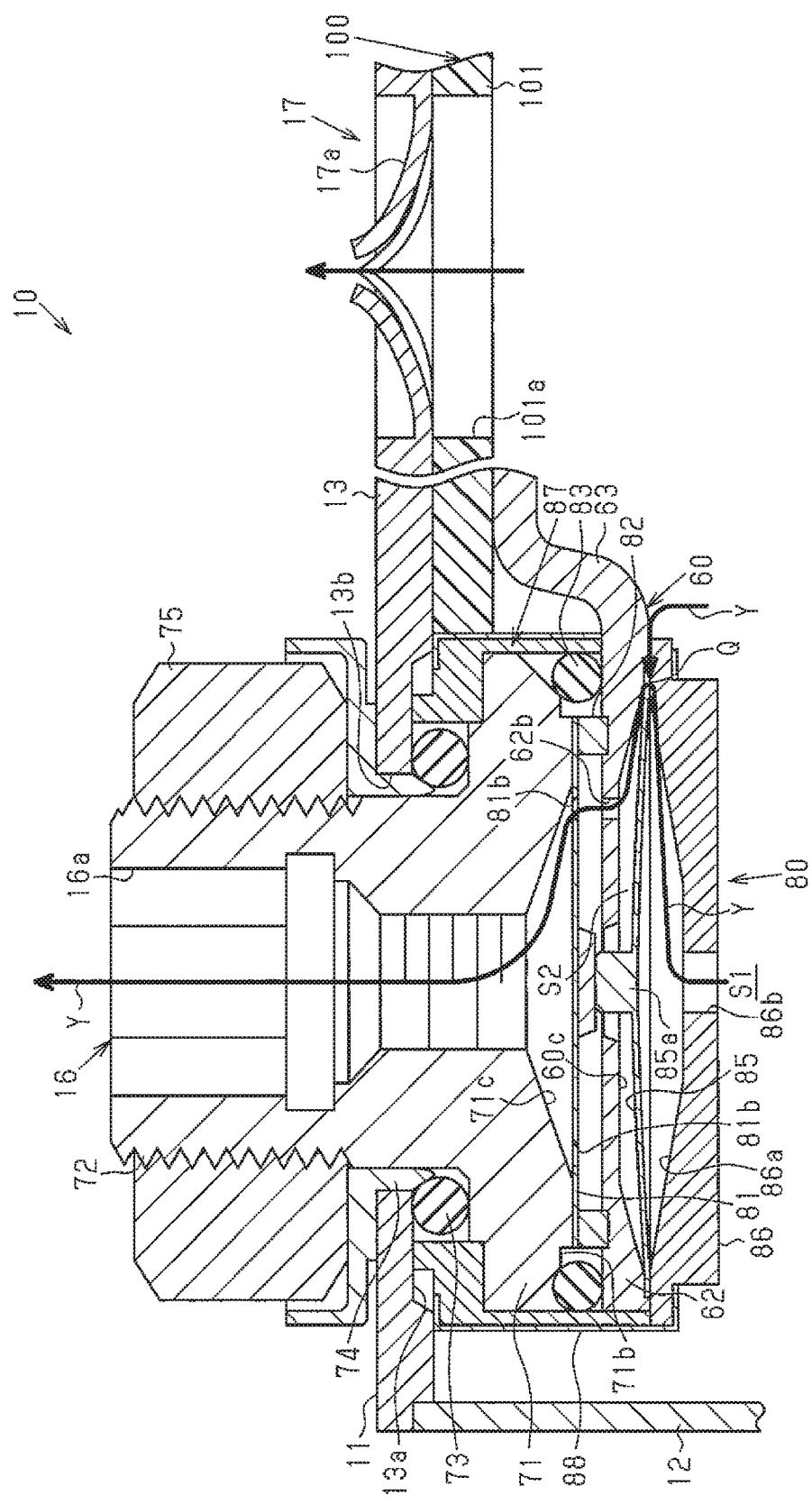
FIG. 7 is a cross-sectional view illustrating a state in which the pressure release valve is activated.

In this case, as shown in FIG. 7, the pressure release valve 17 is activated and ruptured to connect the inside and the outside of the case 11. As a result, the pressure in the case 11 is released to the outside of the case 11. However, even after activation of the pressure release valve 17, the internal pressure of the case 11 may be increased. In this case, when the internal pressure exceeds the sealing portion withstanding pressure P4, the contact portion Q between the deformation plate 85 and the interruption joint portion 62 is broken and loses the sealing function. Thus, as shown by arrow Y in FIG. 7, the first space S1 in the case 11 and the second space S2 in the current interruption mechanism 80 are connected via the gas hole 86b and the broken contact portion Q. Furthermore, the inside and the outside of the case 11 are connected through the communication hole 62b of the interruption joint portion 62, the communication hole 81b of the contact plate 81, and the shaft hole 16a of the negative terminal 16. As a result, the pressure in the case 11 is released to the outside of the case 11. This configuration releases the pressure in the case 11 to the outside of the case 11 from both the pressure release valve 17 and the current interruption mechanism 80 and prevents the internal pressure from reaching the case withstanding pressure P1.

The above-described embodiment has the following advantages.

(1) The sealing portion withstanding pressure P4 of the current interruption mechanism 80 and the valve activation pressure P3 of the pressure release valve 17 are set to be higher than the interruption activation pressure P2 of the current interruption mechanism 80 and less than the case withstanding pressure P1.

Thus, if the internal pressure of the case 11 does not decrease although the current interruption mechanism 80 has been activated, the pressure is released to the outside of the case 11 from the pressure release valve 17 and the current interruption mechanism 80 before the internal pressure reaches the case withstanding pressure P1. Thus, for example, compared with a case in which the pressure is released to the outside of the case 11 with only the pressure release valve 17, the opening area for releasing the pressure is increased, and the pressure is promptly released to the outside of the case 11. This prevents the internal pressure from reaching the case withstanding pressure P1. As a result, the case 11 is prevented from being damaged by increase in the internal pressure.

(2) The sealing portion withstanding pressure P4 is set to be higher than the valve activation pressure P3. Thus, after activation of the pressure release valve 17, the pressure is released from the current interruption mechanism 80. Thus, the pressure release from the pressure release valve 17 is assisted by the current interruption mechanism 80.

(3) The sealing portion withstanding pressure P4 of the current interruption mechanism 80 can be adjusted by the welding strength of the deformation plate 85 with respect to the interruption joint portion 62. Thus, the sealing portion withstanding pressure P4 is set to a desired value in accordance with the case withstanding pressure P1, the interruption activation pressure P2, and the valve activation pressure P3.

(4) In the current interruption mechanism 80, the negative terminal 16 includes the shaft hole 16a. The shaft hole 16a is an internally threaded bore for fastening the bus bar to the negative terminal 16 and has a relatively large opening area. Thus, when the internal pressure reaches the sealing portion withstanding pressure P4, the pressure in the case 11 is promptly released to the outside of the case 11 through the shaft hole 16a.

(5) The interruption activation pressure P2 of the current interruption mechanism 80 is lower than the valve activation pressure P3 of the pressure release valve 17. Thus, the current interruption mechanism 80 is activated to interrupt the current before the pressure release valve 17 is activated.

(6) The current interruption mechanism 80 includes the contact plate 81 and the deformation plate 85. The contact plate 81 allows current to flow between the negative terminal 16 and the negative-electrode conductor 60. The deformation plate 85 is joined to the negative-electrode conductor 60 in a state in which the deformation plate 85 covers the conducting portion P at a position closer to the electrode assembly 14 than the contact plate 81 and between the conducting portion P and the electrode assembly 14. The current interruption mechanism 80 has two deformable plates, which are the contact plate 81 and the deformation plate 85. Since the contact portion Q of the deformation plate 85 is located close to the electrode assembly 14, if the internal pressure of the case 11 reaches the sealing portion withstanding pressure P4 after activation of the pressure release valve 17, the pressure in the case 11 is released to the outside of the case 11 through the broken contact portion Q via the second space S2.

Second Embodiment

Next, a power storage device according to a second embodiment will be described with reference to FIGS. 8 and 9. The power storage device is applied to a rechargeable battery. The detailed description of the configuration of the second embodiment that is the same as the first embodiment will be omitted.

Figure 8:
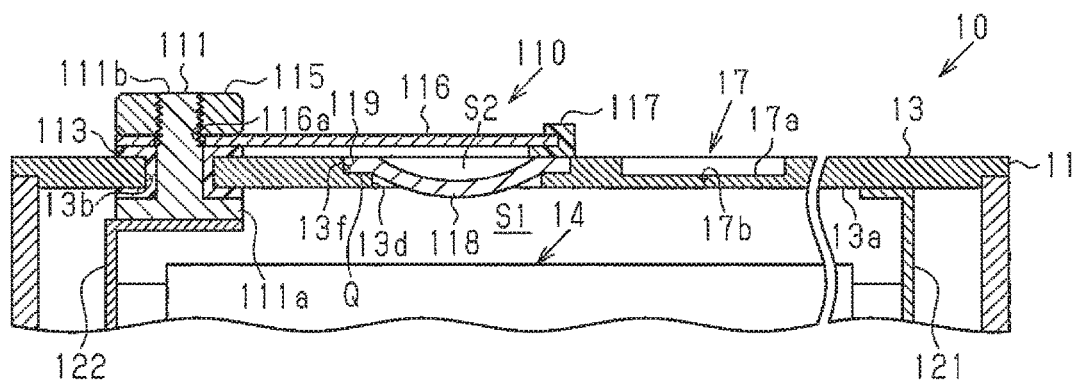
FIG. 8 is a partial cross-sectional view of a current reduction mechanism of a rechargeable battery according to a second embodiment.

As shown in FIG. 8, the rechargeable battery 10 of the second embodiment includes a current reduction mechanism 110. The electrode assembly 14 is a spiral type, and a strip-shaped positive electrode and a strip-shaped negative electrode are wound and stacked in layers. A positive-electrode lead 121 is electrically connected to the positive electrode of the electrode assembly 14, and a negative-electrode lead 122 is electrically connected to the negative electrode 22. The positive-electrode lead 121 is joined to the lid 13. Thus, the positive electrode of the electrode assembly 14 is electrically connected to the case 11 (lid 13) via the positive-electrode lead 121. Thus, in the present embodiment, the case 11 configures a positive terminal. The positive terminal is an electrode terminal having a second polarity.

A negative terminal 111 includes a rectangular column-shaped negative-electrode head 111a and a columnar negative-electrode shaft 111b. The negative-electrode shaft 111b projects from the negative-electrode head 111a toward the lid 13 and has a threaded outer circumferential surface. The negative-electrode shaft 111b projects outside the case 11 via the through-hole 13b of the lid 13. An insulation ring 113 is inserted in the negative-electrode shaft 111b. The insulation ring 113 is fitted to the through-hole 13b of the lid 13. A nut 115 is screwed to the negative-electrode shaft 111b from above the insulation ring 113 so that the negative terminal 111 is secured to the lid 13. The insulation ring 113 insulates the negative terminal 111 from the lid 13.

The negative-electrode lead 122 is electrically connected to the negative-electrode head 111a of the negative terminal 111. Thus, the negative terminal 111 is electrically connected to the negative electrode of the electrode assembly 14 via the negative-electrode lead 122.

The current reduction mechanism 110 includes a negative-electrode short-circuit member 116, which is located outside the lid 13. The negative-electrode short-circuit member 116 is a rectangular metal plate and includes a through hole 116a located close to a first end. The negative-electrode shaft 111b is inserted in the through hole 116a of the negative-electrode short-circuit member 116. The negative-electrode short-circuit member 116 is sandwiched between the insulation ring 113 and the nut 115 and is electrically connected to the negative terminal 111. The negative-electrode short-circuit member 116 is secured to the negative terminal 16 at the first end and is located such that a second end approaches the pressure release valve 17.

The current reduction mechanism 110 includes a U-shaped insulation plate 117. The second end of the negative-electrode short-circuit member 116 is fitted inside the insulation plate 117. The insulation plate 117 is secured to the lid 13 and insulates the negative-electrode short-circuit member 116 from the lid 13. Thus, the first end of the negative-electrode short-circuit member 116 is supported by the insulation ring 113 apart from the lid 13, and the second end is supported by the insulation plate 117 apart from the lid 13. Thus, the entire negative-electrode short-circuit member 116 is apart from the lid 13.

The current reduction mechanism 110 includes a circular inversion opening 13d in the lid 13. The inversion opening 13d is located between the negative terminal 111 and the pressure release valve 17 in the longitudinal direction of the lid 13 and at a position facing the negative-electrode short-circuit member 116. The lid 13 includes an annular mounting recess 13f, which surrounds the inversion opening 13d. The mounting recess 13f is depressed from the outer surface of the lid 13.

The current reduction mechanism 110 includes a deformation plate 118. The deformation plate 118 short-circuits the case 11, which is the positive terminal in this embodiment, and the negative terminal 111. The deformation plate 118 is bowl-shaped and bulges from the outside of the lid 13 toward the inside of the case 11. The deformation plate 118 has a circular shape as viewed from the top. The deformation plate 118 is, for example, a diaphragm configured by a metal plate. The deformation plate 118 includes a connecting flange 119, which surrounds the opening. The connecting flange 119 is fitted to the mounting recess 13f of the lid 13 to be in contact with the lid 13 and is welded to the inner bottom surface of the mounting recess 13f. That is, the contact portion Q between the connecting flange 119 of the deformation plate 118 and the inner bottom surface of the mounting recess 13f is secured by welding. This seals the gap between the deformation plate 118 and the lid 13. As a result, the deformation plate 118 defines the first space S1 and the second space S2 in the case 11. The first space S1 is a space in the case 11, and the second space S2 is a space outside the case 11.

Figure 9:
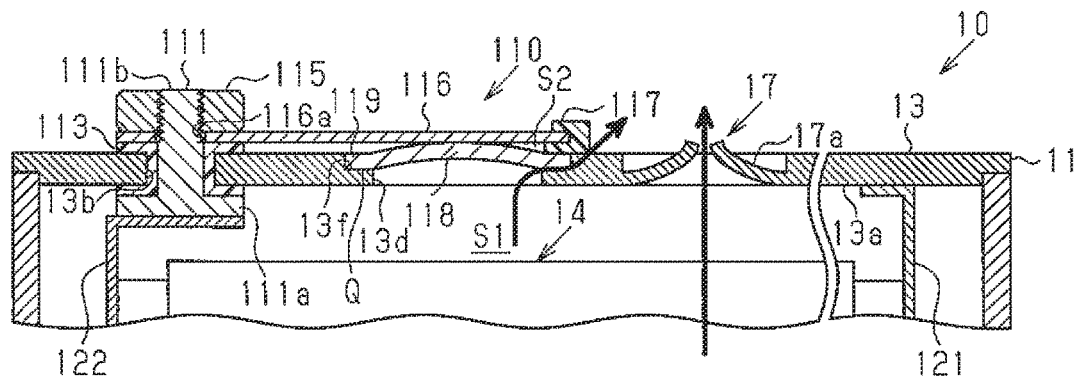
FIG. 9 is a partial cross-sectional view illustrating a state in which the current reduction mechanism and the pressure release valve are activated.

As shown in FIG. 9, when the internal pressure of the case 11 of the rechargeable battery 10 is increased, and the internal pressure of the case 11 reaches the activation pressure, the current reduction mechanism 110 is deformed such that the deformation plate 118 bulges toward the negative-electrode short-circuit member 116. When the deformation plate 118 contacts the negative-electrode short-circuit member 116, a short-circuit member having a first polarity, which is the negative-electrode short-circuit member 116 in this embodiment, and a short-circuit member having the second polarity, which is the case 11 in this embodiment, are short-circuited. Thus, in the present embodiment, the case 11 also configures a positive-electrode short-circuit member that is short-circuited with the negative-electrode short-circuit member 116.

Before activation of the current reduction mechanism 110, that is, before short-circuit occurs, the electrode assembly 14 serves as a current-carrying path between the case 11 and the negative terminal 111. However, after a short-circuit, the deformation plate 118 and the negative-electrode short-circuit member 116 serve as a current-carrying path between the case 11 and the negative terminal 111. The electrical resistance of the deformation plate 118 and the negative-electrode short-circuit member 116 is smaller than the electrical resistance of the electrode assembly 14. As a result, the current that flowed to the case 11 flows through the deformation plate 118 and the negative-electrode short-circuit member 116 to the negative terminal 111. As a result, compared with the state before being short-circuited, the current that flows from the case 11 to the electrode assembly 14 is reduced. This restricts charging of the electrode assembly 14.

An activation pressure P5 for causing the current reduction mechanism 110 to function is set for the current reduction mechanism 110. The activation pressure P5 is a pressure at which current that flows from the case 11 to the electrode assembly 14 is reduced with the current reduction mechanism 110 by deformation of the deformation plate 118. A first surface of the deformation plate 118 faces the first space S1 in the case 11, and a second surface faces the second space S2. Thus, the internal pressure of the case 11 acts on the first surface of the deformation plate 118, and the atmospheric pressure acts on the second surface.

In the current reduction mechanism 110 of the second embodiment, the sealing portion withstanding pressure P4 is set for the contact portion Q. The sealing portion withstanding pressure P4 is a pressure set for maintaining sealing at the contact portion Q. Thus, when the internal pressure of the case 11 exceeds the sealing portion withstanding pressure P4, the contact portion Q is broken and becomes unable to maintain sealing. The sealing portion withstanding pressure P4 can be adjusted by, for example, the penetration depth when welding the connecting flange 119 of the deformation plate 118 to the mounting recess 13f.

The case withstanding pressure P1 is set to the highest among the case withstanding pressure P1, the activation pressure P5, the valve activation pressure P3, and the sealing portion withstanding pressure P4. To activate the current reduction mechanism 110 first when the internal pressure is increased, the activation pressure P5 is set to be the lowest. Furthermore, to allow the pressure release valve 17 to release the pressure after the current reduction mechanism 110 has been activated, the valve activation pressure P3 is set to be higher than the activation pressure P5. In addition, to allow the current reduction mechanism 110 to release pressure after activation of the pressure release valve 17, the sealing portion withstanding pressure P4 is set to be higher than the valve activation pressure P3. Thus, the following relational expression 2 is satisfied.

Working pressure P5<Valve activation pressure P3<Sealing portion withstanding pressure P4<Case withstanding pressure P1      Relational Expression 2

Thus, the second embodiment has the following advantages in addition to the advantages of the first embodiment.

(7) According to the current reduction mechanism 110 of the second embodiment, when the internal pressure of the case 11 reaches the activation pressure P5, the deformation plate 118 is deformed to short-circuit the negative terminal 111 and the case 11 via the negative-electrode short-circuit member 116. The sealing portion withstanding pressure P4 of the current reduction mechanism 110 and the valve activation pressure P3 of the pressure release valve 17 are set to be higher than the activation pressure P5 of the current reduction mechanism 110 and lower than the case withstanding pressure P1.

Thus, if the internal pressure of the case 11 is not reduced even after activation of the current reduction mechanism 110, the pressure is released to the outside of the case 11 through the pressure release valve 17 and the current reduction mechanism 110 before the internal pressure reaches the case withstanding pressure P1. Thus, for example, compared with a case in which the pressure is released to the outside of the case 11 with only the pressure release valve 17, the opening area for releasing the pressure is increased, and the pressure is promptly released to the outside of the case 11. This prevents the internal pressure from reaching the case withstanding pressure P1. As a result, the case 11 is prevented from being damaged by increase in the internal pressure.

The above-described embodiment may be modified as follows.

Figure 10:
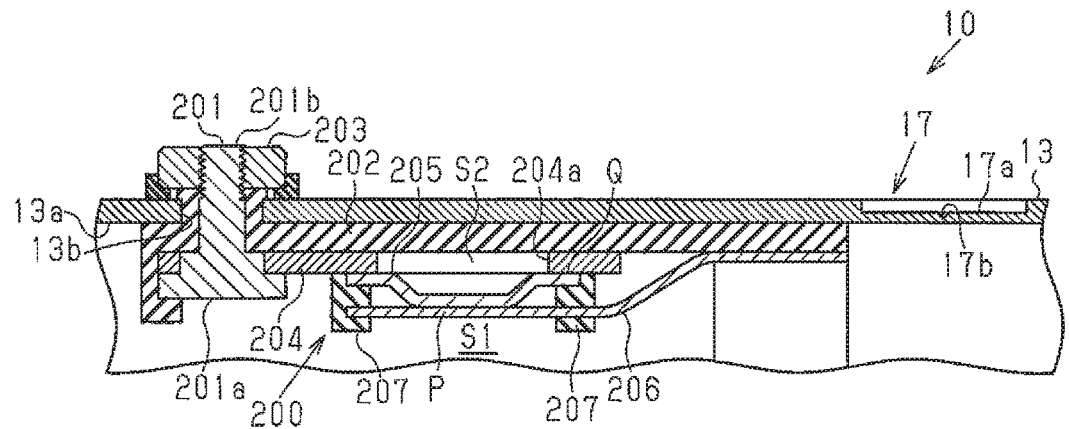
FIG. 10 is a partial cross-sectional view of a current interruption mechanism according to a modified embodiment.

As shown in FIG. 10, a current interruption mechanism 200 may include only one deformation plate. In this case, a negative terminal 201 includes a rectangular column-shaped negative-electrode head 201a and a columnar negative-electrode shaft 201b. The negative-electrode shaft 201b projects from the negative-electrode head 201a toward the lid 13 and has a threaded outer circumferential surface. The negative-electrode shaft 201b projects to the outside of the case 11 via the through-hole 13b of the lid 13. The negative-electrode shaft 201b is inserted in an insulation plate 202. The insulation plate 202 insulates the lid 13 and the negative terminal 201 from each other in the case 11. A nut 203 is screwed to the negative-electrode shaft 201b from above the insulation plate 202 so that the negative terminal 201 is secured to the lid 13. The insulation plate 202 insulates the negative terminal 201 from the lid 13 on the outside of the case 11.

The negative electrodes of the electrode assembly 14 are electrically connected to the negative-electrode head 201a of the negative terminal 201 via a first negative-electrode conductor 204, a deformation plate 205, and a second negative-electrode conductor 206. The first negative-electrode conductor 204 is a rectangular plate. The first negative-electrode conductor 204 is secured to the negative-electrode head 201a at a first end portion and is located such that a second end portion approaches the pressure release valve 17. The first negative-electrode conductor 204 includes a through-hole 204a at the second end portion.

The second negative-electrode conductor 206 is a rectangular plate and is shaped like a crank. A first end section of the second negative-electrode conductor 206 is supported by a support member 207 at a position closer to the electrode assembly 14 than the first negative-electrode conductor 204. A second end portion of the second negative-electrode conductor 206 is electrically connected to the negative-electrode tabs 32 of the electrode assembly 14.

The current interruption mechanism 200 includes the deformation plate 205. The deformation plate 205 is a diaphragm formed of a conductive material. The deformation plate 205 is shaped like a disk. The deformation plate 205 is located between the first negative-electrode conductor 204 and the electrode assembly 14 and covers the through-hole 204a of the first negative-electrode conductor 204. The outer circumferential portion of the deformation plate 205 that protrudes outward of the through-hole 204a is joined to the peripheral portion of the through-hole 204a of the first negative-electrode conductor 204 by welding.

The contact portion Q between the outer circumferential portion of the deformation plate 205 and the first negative-electrode conductor 204 is secured by welding. This seals the gap between the deformation plate 205 and the first negative-electrode conductor 204. The current interruption mechanism 200 includes the second space S2 defined by the through-hole 204a of the first negative-electrode conductor 204, the deformation plate 205, and the insulation plate 202. The second space S2 is hermetically sealed. The deformation plate 205 defines the first space S1 and the second space S2 in the case 11.

The deformation plate 205 bulges toward the second negative-electrode conductor 206 before being deformed. The bulging portion of the deformation plate 205 contacts the second negative-electrode conductor 206. The joint portion serves as a conducting portion P. Thus, the deformation plate 205 is electrically connected to the negative terminal 201 and the electrode assembly 14 via the first negative-electrode conductor 204 and the second negative-electrode conductor 206.

Figure 11:
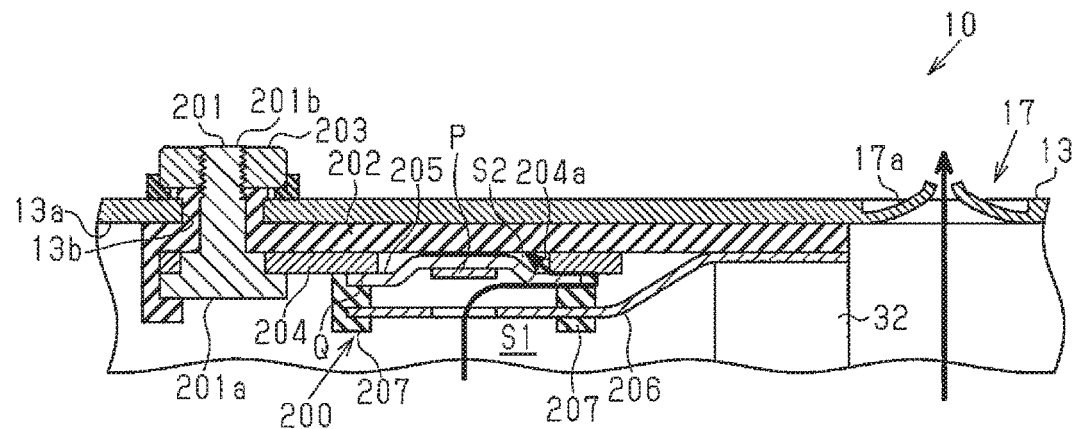
FIG. 11 is a partial cross-sectional view illustrating a state in which the current interruption mechanism and a pressure release valve according to the modified embodiment are activated.

As shown in FIG. 11, in the rechargeable battery 10, when the internal pressure of the case 11 is increased and exceeds the interruption activation pressure P2, the internal pressure of the case 11 deforms the deformation plate 205 to bulge toward the first negative-electrode conductor 204. Accordingly, in the rechargeable battery 10, the second negative-electrode conductor 206 is broken to physically disconnect the conductive path between the negative terminal 201 and the negative-electrode conductor 206. Thus, the current is interrupted.

In the second embodiment, the case 11 serves as the positive-electrode short-circuit member and the positive electrode terminal. However, if the positive electrode terminal is provided separately from the case 11, and the case has no polarity, a positive-electrode short-circuit member is electrically connected to the positive electrode terminal. A deformation plate that is electrically connected to both the negative-electrode short-circuit member and the positive-electrode short-circuit member may be provided to be in contact with the case. When the internal pressure of the case 11 is increased, the deformation plate may be deformed such that the deformation plate short-circuits the negative-electrode short-circuit member and the positive-electrode short-circuit member.

As long as the sealing portion withstanding pressure P4 and the valve activation pressure P3 are lower than the case withstanding pressure P1 and higher than the interruption activation pressure P2 or the activation pressure P5, the valve activation pressure P3 may be higher than the sealing portion withstanding pressure P4. In this case, the following relational expression 3 is satisfied.

Interruption activation pressure P2 or activation pressure P5<Sealing portion withstanding pressure P4<Valve activation pressure P3<Case withstanding pressure P1     Relational Expression 3

As long as the sealing portion withstanding pressure P4 and the valve activation pressure P3 are lower than the case withstanding pressure P1 and higher than the interruption activation pressure P2 or the activation pressure P5, the sealing portion withstanding pressure P4 and the valve activation pressure P3 may be the same. In this case, the following relational expression 4 is satisfied.

Interruption activation pressure $P2$ or activation pressure $P5$<Sealing portion withstanding pressure $P4$=Valve activation pressure $P3$<Case withstanding pressure $P1$     Relational Expression 4

When the relational expression 4 is satisfied, after activation of the current interruption mechanism 80 or the current reduction mechanism 110, the point in time at which the pressure is released from the current interruption mechanism 80 or the current reduction mechanism 110 is the same as the point in time at which the pressure is released from the pressure release valve 17. Thus, the pressure in the case 11 is simultaneously released from the current interruption mechanism 80 or the current reduction mechanism 110 and the pressure release valve 17. Thus, a period during which the pressure is released from only one of the pressure release valve 17 and either the current interruption mechanism 80 or the current reduction mechanism 110 is eliminated, and the pressure is more promptly released.

In the first embodiment, since the deformation plate 85 configures part of the current-carrying path, the contact portion Q is formed by welding the deformation plate 85 to the interruption joint portion 62. This seals the gap between the deformation plate 85 and the interruption joint portion 62. However, in a case in which the deformation plate 85 does not configure the current-carrying path, for example, in a case in which the connection between the conductor and the electrode terminal can be switched on and off with a switch mechanism, the deformation plate is deformed to switch on and off the switch mechanism. In this case, the deformation plate contacts the conductor to define the first space S1 and the second space S2 in the case 11, and the contact portion between the deformation plate and the conductor is sealed. At the contact portion, the deformation plate does not necessarily have to be welded to the conductor. In this case, a sealing member such as an O-ring or a gasket may be located between the deformation plate and the conductor for sealing.

Alternatively, the deformation plate may be made of rubber or plastic, and the deformation plate may be melted and bonded to the conductor for sealing.

The power storage device may be applied to a rechargeable battery that includes the current interruption mechanism 80 or the current reduction mechanism 110 that is integral with the positive terminal 15.

The power storage device is applicable to a power storage device other than a rechargeable battery. The power storage device may be applied to, for example, a capacitor.

Each positive electrode 21 and each negative electrode 22 may include active material only on one side of a foil.

The rechargeable battery 10 may be a lithium-ion rechargeable battery or may be other rechargeable batteries. That is, any configuration may be employed as long as ions move between the positive-electrode active material and the negative-electrode active material, and the positive-electrode active material and the negative-electrode active material supply and receive electric charge.

The electrode assembly 14 is not limited to a stacked type, but may also be a spiral type in which strip-shaped positive electrodes and strip-shaped negative electrodes are wound and stacked in layers.

The technical ideas obtainable from the above embodiments and the modifications are described below.

(1) A power storage device in which the sealing portion withstanding pressure is less than the valve activation pressure.

(2) A power storage device in which the sealing portion withstanding pressure and the valve activation pressure are the same.

DESCRIPTION OF THE REFERENCE NUMERALS

Q . . . contact portion, P . . . conducting portion, P1 . . . case withstanding pressure, P2 . . . interruption activation pressure, P3 . . . valve activation pressure, P4 . . . sealing portion withstanding pressure, P5 . . . activation pressure, S1 . . . first space, S2 . . . second space, 10 . . . power storage device, which is a rechargeable battery in this embodiment, 11 . . . case, 13 . . . wall portion, which is a lid in this embodiment, 14 . . . electrode assembly, 15 . . . electrode terminal, which is a positive terminal in this embodiment, 16, 111, 201 . . . electrode terminal, which is a negative terminal in this embodiment, 17 . . . pressure release valve, 40 . . . positive-electrode conductor, 60 . . . negative-electrode conductor, 80, 200 . . . current interruption mechanism, 81 . . . contact plate, 85, 118, 205 . . . deformation plate, 110 . . . current reduction mechanism, 116 . . . negative-electrode short-circuit member, 204 . . . first negative-electrode conductor.

The invention claimed is:

1. A power storage device comprising:
   an electrode assembly;
   a case, which accommodates the electrode assembly;
   an electrode terminal, which supplies and receives power to and from the electrode assembly;
   a conductor, which connects the electrode assembly to the electrode terminal;
   a current interruption mechanism, which interrupts a current-carrying path between the electrode terminal and the electrode assembly when an internal pressure of the case reaches an interruption activation pressure; and
   a pressure release valve, which is located on a wall portion of the case and releases the pressure in the case to the outside of the case when the internal pressure of the case exceeds a valve activation pressure, wherein
   the current interruption mechanism includes
      a conducting portion, which allows current to flow between the electrode terminal and the conductor, and
      a deformation plate, which contacts the conductor and defines, in the case, a first space, a pressure in which is equal to the internal pressure of the case, and a second space, a pressure in which is maintained at a pressure outside the case, wherein a contact portion between the deformation plate and the conductor is sealed,
   the current interruption mechanism is configured such that, when the internal pressure of the case reaches the interruption activation pressure, the deformation plate receives the internal pressure and is deformed to break the conducting portion,
   the current interruption mechanism is further configured such that, when the internal pressure of the case exceeds a sealing portion withstanding pressure, which is defined as a pressure that is set for maintaining the sealing at the contact portion, a sealing function at a sealing portion is lost, thereby releasing the pressure in the case to the outside of the case from the first space via the second space,
   a pressure that is set for maintaining the shape of the case is defined as a case withstanding pressure,
   the sealing portion withstanding pressure and the valve activation pressure are set higher than the interruption activation pressure and lower than the case withstanding pressure, and
   the sealing portion withstanding pressure is set higher than the valve activation pressure.

2. The power storage device according to claim 1, wherein the current interruption mechanism includes a contact plate, which allows current to flow between the electrode terminal and the conductor via the conducting portion and is located in the second space, and the deformation plate contacts a surface of the conductor facing the electrode assembly in a state in which the deformation plate is located at a position closer to the electrode assembly than the contact plate and between the conducting portion and the electrode assembly and in which the deformation plate covers the conducting portion.

3. The power storage device according to claim 1, wherein the power storage device is a rechargeable battery.

4. A power storage device comprising:

an electrode assembly;

a case, which accommodates the electrode assembly;

an electrode terminal, which supplies and receives power to and from the electrode assembly;

a conductor, which connects the electrode assembly to the electrode terminal;

a current interruption mechanism, which interrupts a current-carrying path between the electrode terminal and the electrode assembly when an internal pressure of the case reaches an interruption activation pressure; and a pressure release valve, which is located on a wall portion of the case and releases the pressure in the case to the outside of the case when the internal pressure of the case exceeds a valve activation pressure, wherein the current interruption mechanism includes a conducting portion, which allows current to flow between the electrode terminal and the conductor, and a deformation plate, which contacts the conductor and defines, in the case, a first space, a pressure in which is equal to the internal pressure of the case, and a second space, a pressure in which is maintained at a pressure outside the case, wherein a contact portion between the deformation plate and the conductor is sealed, the current interruption mechanism is configured such that, when the internal pressure of the case reaches the interruption activation pressure, the deformation plate receives the internal pressure and is deformed to break the conducting portion, the current interruption mechanism is further configured such that, when the internal pressure of the case exceeds a sealing portion withstanding pressure, which is defined as a pressure that is set for maintaining the sealing at the contact portion, a sealing function at a sealing portion is lost, thereby releasing the pressure in the case to the outside of the case from the first space via the second space, in a case in which the electrode assembly expands and contracts in accordance with normal charging and discharging, a pressure that is set for maintaining the shape of the case within a range in which the case expands and contracts in accordance with the expansion and contraction of the electrode assembly is defined as a case withstanding pressure, the sealing portion withstanding pressure and the valve activation pressure are set higher than the interruption activation pressure and lower than the case withstanding pressure, and the sealing portion withstanding pressure is set higher than the valve activation pressure.

5. A power storage device comprising:

an electrode assembly;

a case, which accommodates the electrode assembly;

positive-electrode and negative electrode terminals, which supply and receive power to and from the electrode assembly;

a current reduction mechanism, which reduces current from the electrode terminals to the electrode assembly when the internal pressure of the case reaches an activation pressure; and a pressure release valve, which is located on a wall portion of the case and releases the pressure in the case to the outside of the case when the internal pressure of the case exceeds a valve activation pressure, wherein the current reduction mechanism includes a short-circuit member electrically connected to one of the electrode terminals, and a deformation plate, which is arranged to be in contact with the case and defines a first space, a pressure in which is equal to the internal pressure of the case, and a second space, a pressure in which is maintained at a pressure outside the case, wherein a contact portion between the deformation plate and the case is sealed, the current reduction mechanism is configured such that when the internal pressure of the case reaches the activation pressure, the deformation plate is deformed by receiving the internal pressure and allows current to flow through the short-circuit member via the deformation plate, the current interruption mechanism is further configured such that, when the internal pressure of the case exceeds a sealing portion withstanding pressure, which is defined as a pressure that is set for maintaining the sealing at the contact portion, a sealing function at a sealing portion is lost, thereby releasing the pressure in the case to the outside of the case from the first space via the second space, a pressure that is set for maintaining the shape of the case is defined as a case withstanding pressure, the sealing portion withstanding pressure and the valve activation pressure are set higher than the activation pressure and lower than the case withstanding pressure, and the sealing portion withstanding pressure is set higher than the valve activation pressure.

\* \* \* \* \*